Dec. 28, 1965   L. S. DEITZ, JR   3,225,428
METHOD OF RECLAIMING COPPER FROM INSULATED COPPER WIRE
Filed Sept. 11, 1964
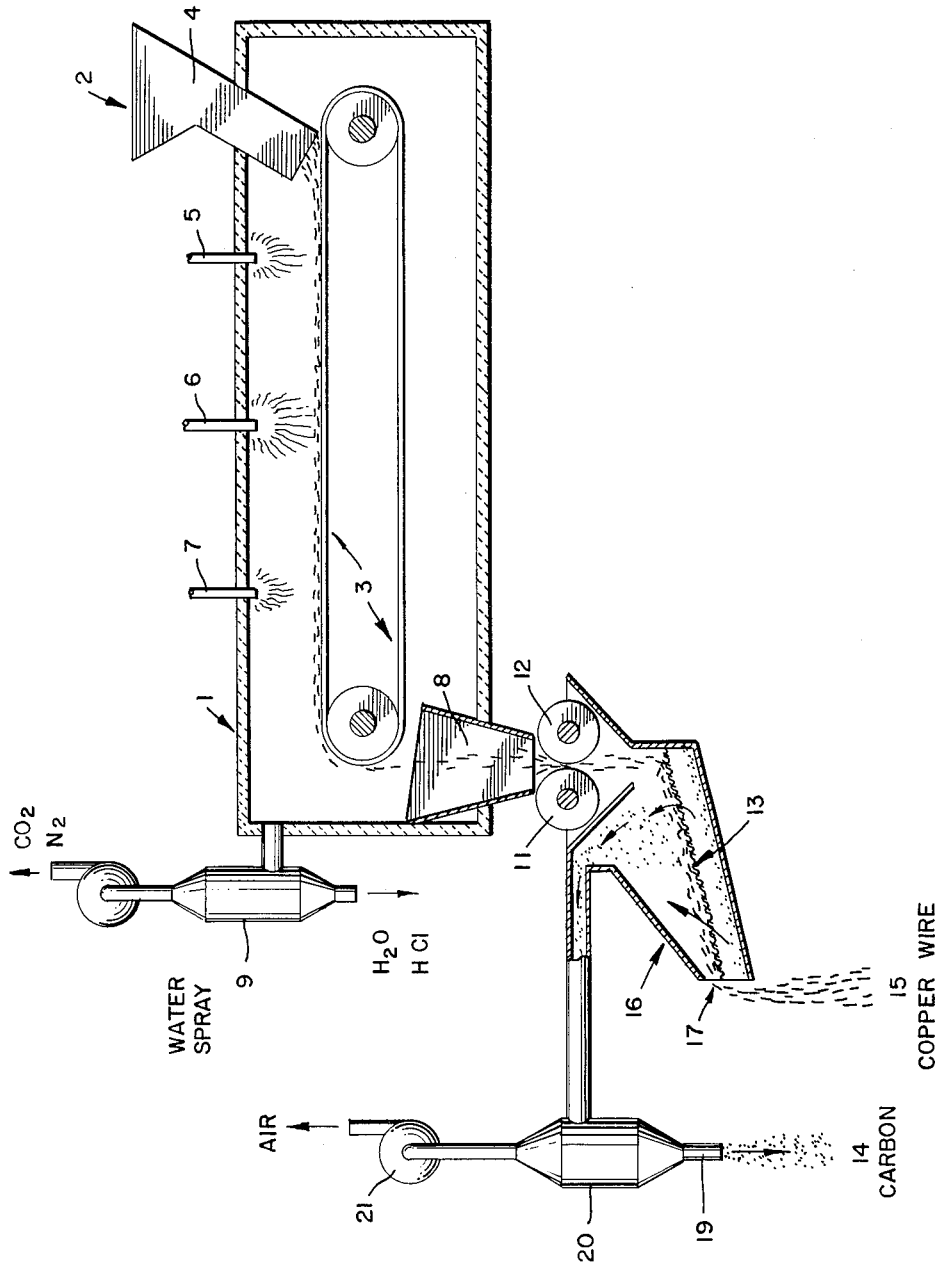
INVENTOR.
LOUIS S. DEITZ, JR.
BY Darley & Darley
ATTORNEYS United States Patent Office
3,225,428
Patented Dec. 28, 1965

3,225,428
METHOD OF RECLAIMING COPPER FROM INSULATED COPPER WIRE
Louis S. Deitz, Jr., 551 Bradford Ave., Westfield, N.J.
Filed Sept. 11, 1964, Ser. No. 395,848
11 Claims. (Cl. 29—403)

The present invention relates to a process for the recovery of copper wire from insulated copper wire.

More particularly, the present invention is concerned with a method of treating a vinyl plastic insulated copper wire and recovering the copper wire therefrom.

During recent years the use of plastics has increased tremendously. The development of materials for new and wider uses has been both a cause and a result of the rapid expansion of the industry. Vinyl plastics have been known for many years and have found increasing use in the last ten years for coatings for cables and wires. These vinyl plastics have rapidly been replacing rubber or other insulators for cables and wires due to their outstanding properties. Vinyl plastics are non-flammable at low temperatures, highly resistant to abrasion, have a high degree of toughness and are unusually resistant to oxygen and ozone. As a result of these outstanding properties, the use of vinyl plastics rather than rubber for insulation coverings has been and still is rapidly increasing in the electrical industry. The recovery of copper wire from rubber insulation has been and is currently carried out in a furnace at temperatures in excess of 750° C. and in the presence of excess air. At these high temperatures, the rubber insulation is burned off but deposits of the insulation are left on the copper wire. Oxidation of the wire results at these elevated temperatures. Subsequently, when the copper wire is fed into a furnace, for remelting for the production of wire bars or other semi-finished commercial shapes, considerable slag is produced from the oxidized copper wire.

Although rubber insulation for copper wire is being replaced by vinyl plastics, such as polyvinyl chloride, the same process used for the recovery of copper wire from rubber insulation was also used to recover copper wire from the new type of vinyl plastic insulation. The recovery of copper wire from polyvinyl chloride insulation, or similar vinyl plastic materials, is a difficult and costly task, having definite restrictions due to the chemical composition of polyvinyl chloride. It was found that when polyvinyl chloride insulation was burned at elevated temperatures, such as 750° C., large quantities of corrosive hydrogen chloride gas was evolved. This gas is highly corrosive to the furnaces, flues and stacks and creates a public nuisance, due to the acrid odor of the gas. While furnaces could be built which were resistant to HCl corrosion, the public nuisance problem could not be overcome except by burning off the polyvinyl chloride insulation in isolated areas.

Thus, as a result of increased use of polyvinyl chloride as insulation and the consequent accumulation of polyvinyl chloride covered scrap wire, it became necessary to build new furnaces in isolated areas, away from convenient industrial and suburban sites, in order to carry out the recovery of large quantities of copper wire from polyvinyl chloride insulated wire. The location of these furnaces in remote areas to eliminate the nuisance factor of undesirable fumes is costly because the vinyl plastic insulated wire has to be shipped from industrial areas, where the scrap is generated or accumulates, to the furnaces where the insulation is burned off and then shipped back to industrial sites where the recovered copper wire is melted down for reuse.

At high temperatures of about 750° C. or more the burning off of the polyvinyl chloride insulation is an exothermic reaction which results in the evolution of large volumes of HCl gas, this gas being more corrosive at these high temperatures. In addition, this process of recovering copper wire from polyvinyl chloride insulation results in an oxidized copper wire. As a result, the efficiency of recovering the copper wire is diminished because the remelting of the copper wire yields increased slag, the increase resulting from the oxidized materials of the wire.

According to the present invention, a process is provided which permits the burning of vinyl plastic wire coverings, such as halogenated vinyl polymer coverings, in industrial areas without the presence of the problems which were present with the prior process of recovering copper wire from polyvinyl chloride wire coverings.

It is an object of the present invention to provide a process for recovering copper wire insulated with a vinyl plastic type of insulation wherein the process is carried out in the presence of a limited amount of air.

It is another object of the present invention to carry out the process for recovering copper wire according to the present invention under controlled temperature conditions, so as to prevent the formation of hydrogen halide gas at temperatures which cause corrosion.

It is another object of the present invention to provide recovered copper wire which is not oxidized by the decomposition of the vinyl plastic type insulation.

Another object of the present invention is to provide a process for recovering copper wire from a halogenated polyvinyl polymer type of insulation which is economical, results in a high grade of recovered copper wire and overcomes the restrictions present in the prior art process.

Further objects and advantages of the present invention will be apparent from a consideration of the following description in conjunction with the appended drawing which is a diagrammatic illustration of a furnace employed according to the present invention.

To present a better understanding of the process of the present invention, the nature of a typical halogenated vinyl polymer insulation composition will be discussed.

A typical vinyl plastic wire covering consists of a polymer such as polyvinyl chloride and a plasticizer as the main component with minor amounts of a stabilizer and a lubricant.

Polyvinyl chloride has the composition $C_2H_3Cl$ usually containing about 35.8% chlorine, equivalent to 37.1% HCl. The plasticizer employed in the insulation composition is usually a dioctylphthalate, tritolylphosphate or a di-iso-octylphthalate. The plasticizer is frequently present in the insulation in amounts of about one-half of the polymer. A stabilizer is employed to inhibit the formation of hydrochloric acid under adverse conditions. Hence, it is obvious from the composition of polyvinyl chloride that rapid heating at excess temperatures in the presence of air will result not only in the evolution of large quantities of HCl gas, but also in the formation of larger quantities of $CO_2$ gas.

The process of the present invention makes use of the fact that polyvinyl halides can be decomposed completely at temperatures of about 230°–250° C. in the presence of insufficient air to ignite the insulation. Under these conditions the decomposition is endothermic, making it necessary to supply heat for the decomposition.

On heating copper wires covered with polyvinyl chloride insulation in the absence of air, it was discovered that the insulation is completely decomposed at temperatures between 230° C. and 250° C. producing HCl gas, $CO_2$ gas, solid carbon, and a small amount of crystalline and tarry substance, the last two items collecting below 100° C. The presence of a small amount of air in the furnace used to burn off the insulation results in the oxidation of the crystalline and tarry substances which are removed with the gases.

According to the present invention, control of the temperature range in the furnace and limitation of the air present results in the recovery of copper wire which is not oxidized and in the evolution of not more than one fourth the gases which are evolved in the prior art process with the presence of air.

The process of the present invention will be better understood by reference to the figure on the drawing.

Referring to the figure on the drawing, there is shown a furnace 1, into which polyvinyl chloride insulated copper wire scrap 2 or cable is fed onto a conveyor 3 by means of a feed hopper 4. The conveyor 3 is preferably made of steel or alloy and preferably runs in the same direction as the gases evolved from the decomposition of the polyvinyl chloride insulation.

However, it is also possible to operate the conveyor so that the scrap insulation passes through the furnace counter current to the direction of the gases evolved. This procedure is not so desirable since it does not give as complete a combustion of the insulation at the desired temperature as with the concurrent flow of the scrap material.

The temperature of the furnace 1 and the distribution of the heat are controlled by the rate of feed of the scrap material and the fuel input through burners 5, 6 and 7. The fuel input is adjusted so that the maximum temperature in the furnace 1 does not exceed 350° C., this temperature being attained by the copper wire as it passes under burner 6, which has a higher fuel input than burners 5 and 7. This difference in fuel input between burners 5, and 6 and 7, so as to achieve the maximum temperature in the area of burner 6, results in a gradual heating of the polyvinyl chloride insulation 2 as it enters the furnace 1. This gradual heating to the decomposition point of the polyvinyl chloride insulation prevents the sudden decomposition of the insulation and the sudden evolution of excess quantities of HCl gas.

According to the instant invention, as the polyvinyl chloride insulated copper wire reaches the maximum temperature point in the furnace 1, the insulation will have completely decomposed, since the decomposition of the insulation takes place at a temperature of between 230° C.–250° C., at which temperature the hydrogen chloride gas and $CO_2$ gas are evolved. The evolution of these gases at temperatures of 230° to 250° C. in the presence of insufficient air prevents ignition of the insulation materials in the furnace, and considerably diminishes the quantity of gases evolved.

Furnace 1 is insulated so that the temperature of the furnace walls from the feedpoint of the scrap material to the discharge point of the gases is at least 100° C. Temperatures above 100° C. are necessary to prevent the condensation of the hydrogen chloride gas on the furnace walls.

As the insulated material 2 reaches a point between burners 6 and 7, it is already completely decomposed and the recovered copper wire falls from the conveyor 3 into hopper 8.

The hydrogen chloride gas evolved is removed from the furnace by means of a wet scrubber 9 which may be a standard water-spray type unit for scrubbing out hydrochloric acid.

The hydrogen chloride gas is drawn into the water scrubber by blower 10 and goes into solution due to its high solubility in water. Hence the hydrogen chloride gas is removed from the scrubber as dilute hydrochloric acid, which of course has many commercial applications.

The other gases resulting from the decomposition of the polyvinyl chloride insulation consist chiefly of $CO_2$ and small amounts of nitrogen from the small amount of air originally present. These gases are exhausted into the air by means of the blower 10, which also draws these gases through the wet scrubber 9.

The low temperature heating of the polyvinyl chloride insulation while preventing oxidation of the copper wire does not completely remove carbon deposits 16 which adhere loosely to the recovered copper wire. These carbon deposits are conveniently and easily separated from the copper wire by mechanical means.

A conventional unit for separating the carbon 14 from the copper wire 15 is shown in FIGURE 1, wherein the recovered copper wire passes through hopper 8 and between breaker rolls 11 and 12, which break the carbon 14 from the copper wire 15.

The copper wire 15 free of the adhering carbon is deposited on a screen 13 in receiver 16, and is removed from the receiver by gravity through aperture 17.

In the usual manner the carbon 14 in the receiver 16 is entrained in the air current provided by the blower 21 of the cyclone separator 20 and is deposited on the walls of the separator and falls by gravity to and through the discharge 19.

A specific illustrative non-limiting example of an insulation composition forming the material to which the process of the present invention is applied will now be given.

A typical polyvinyl chloride insulated compound is as follows:

|  | Percent by weight |
| --- | --- |
| Polyvinyl chloride | 63.3 |
| Plasticizer | 31.7 |
| Stabilizer | 4.4 |
| Lubricant | 0.6 |

In a polyvinyl chloride insulation of this nature white lead is a commonly used stabilizing agent, and calcium stearate is used as a lubricant.

A material balance from treating polyvinyl chloride insulated copper wire by the process of the present invention is as follows:

|  | Total weight, gm. | Percent | Grams | Percent by wt. |
| --- | --- | --- | --- | --- |
| In: |  |  |  |  |
| Insulated cable | 30.1 |  |  |  |
| Copper wire |  | 50.4 | 15.2 | 50.4 |
| Insulation |  | 49.6 | 14.9 | 49.6 |
| Total In |  |  | 30.1 | 100.0 |
| Out: |  |  |  |  |
| Copper wire 15.2 gm |  |  | 15.2 | 50.4 |
| Carbon |  |  | 6.2 | 20.6 |
| HCl gas (scrubbed out) |  |  | 5.5 | 18.3 |
| $CO_2$ gas (exhausts to air) |  |  | 3.2 | 10.7 |
| Total Out |  |  | 30.1 | 100.0 |

As can be seen from the input and output data given above, copper wire is recovered unoxidized.

The process of the present invention thus affords a highly advantageous and superior method for recovery of copper wire from vinyl plastic insulation, since the copper recovered is of high grade due to the absence of oxidized copper wire. Hence the copper wire is more suitable for remelting for the production of the wire bars or other semifinished commercial shapes.

The recovered copper wire obtained from this invention affords a saving in the quantity of wire needed to produce a given quantity of remelted wire bars, because the oxidized copper wire obtained from the prior art process upon remelting yields larger quantities of slag or waste materials. Hence, a larger quantity of the oxidized copper wire is required than unoxidized copper wire to yield the same quantity of remelted wire bars. Moreover, the oxidized copper wire resulting from the prior art recovery process requires longer time to refine due to the formation of slag.

In addition to the modification of the invention specifically illustrated and described herein, other embodiments are possible. For example, the process is equally applicable to polyvinyl fluoride insulation and to insulation formed of copolymers containing vinylidene chloride.

The refractory furnace and conveyor system shown in FIGURE 1 is merely illustrative and other conventional furnaces may be employed in conjunction with the process. Other variations and embodiments will be apparent to those skilled in the art and it is accordingly desired that the scope of the invention not be limited to those embodiments particularly illustrated or suggested, but that the scope of the invention be defined by reference to the appended claims.

What is claimed is:

1. A process for the recovery of wire from vinyl plastic insulation for said wire which comprises heating said insulated wire in the presence of a limited amount of air at a temperature sufficient to decompose the insulation and not in excess of about 350° C., thereby recovering unoxidized wire.

2. A process for the recovery of copper wire from vinyl plastic insulation for said wire which comprises heating said insulated copper wire in the presence of a limited amount of air at a temperature sufficient to decompose said insulation and not in excess of about 350° C., thereby recovering unoxidized copper wire.

3. A process for the recovery of copper wire from a halogenated vinyl polymer insulation for said wire which comprises heating said insulation in the presence of a limited amount of air and at a temperature sufficient to cause decomposition of said insulation, and not in excess of about 350° C., thereby recovering unoxidized copper wire.

4. A process for the recovery of copper wire from polyvinylchloride insulation for said wire which comprises heating said insulated wire in the presence of a limited amount of air and at a temperature sufficient to cause decomposition of said insulation and not in excess of about 350° C., thereby recovering unoxidized copper wire.

5. A process according to claim 4 wherein hydrogen chloride and carbon dioxide form as a result of the decomposition of the polyvinyl chloride insulation, said hydrogen chloride being removed by means of a wet scrubber.

6. A process according to claim 5 wherein the hydrogen chloride gas is recovered from the wet scrubber as hydrochloric acid and the carbon dioxide is exhausted by means of a blower into the air.

7. A process according to claim 5 wherein the heating of the polyvinyl chloride insulation takes place in a furnace, said furnace being insulated so that the temperature does not drop below 100° at any point in the furnace.

8. A process according to claim 7 wherein the decomposition of the polyvinyl chloride insulation takes place prior to the copper wire reaching the maximum temperature.

9. A process according to claim 7 wherein the insulated copper wire is fed through the furnace from a receiving end to a discharge end wherein the fuel input is controlled so that the temperature at the receiving and discharge ends of the furnace does not exceed about 150°, thereby resulting in a gradual heating of the said insulation until the decomposition temperature is reached.

10. A process according to claim 9 wherein said insulated wire is fed at a constant rate through the furnace.

11. A process for the recovery of copper wire from polyvinylchloride insulation for said wire which comprises heating said insulated wire in the presence of a limited amount of air and at a temperature sufficient to cause decomposition of said insulation and not in excess of about 350° C., thereby recovering unoxidized copper wire having adhering carbon deposits which are removed from said wire by mechanical means.

References Cited by the Examiner
UNITED STATES PATENTS

| | | | |
|---|---|---|---|
| 2,852,418 | 9/1954 | MacDonald | 134—2 |
| 3,116,545 | 1/1964 | Brown | 29—403 |
| 3,163,929 | 1/1965 | Goodstein | 29—403 |

WHITMORE A. WILTZ, *Primary Examiner.*